United States Patent [19]

Glikman et al.

[11] 4,081,260
[45] Mar. 28, 1978

[54] PROCESS FOR MAKING SHEET GLASS ON A FLUID SUPPORT

[76] Inventors: Mark Leonovich Glikman, ploschad Kommunarnaya, 11, Kv. 45, Saratov; Jury Mikhailovich Tjurin, Belovezhskaya ulitsa, 61, Kv. 131, Moscow; Gennady Nikolaevich Gorshkov, ulitsa Michurina, 114, Kv. 1, Saratov; Vladilen Alexandrovich Gorokhovsky, ulitsa Lomonosova, 3, Kv. 9, Saratov; Alexei Georgievich Shabanov, ulitsa Lampovaya, 3, Kv. 35, Saratov; Zakhar Isaevich Sapunar, ulitsa Mezhdunarodnaya, 26, Kv. 31, Saratov; Albert Vladimirovich Avrus, ulitsa Zagoradneva, 15, Kv. 77, Saratov; Evgeny Borisovich Fainberg, Okyabrsky poselok, 8 Linia, 32, Saratov, all of U.S.S.R.

[21] Appl. No.: 749,998

[22] Filed: Dec. 13, 1976

[51] Int. Cl.² .............................................. C03B 18/02
[52] U.S. Cl. .................................. 65/25 A; 65/65 A; 65/99 A
[58] Field of Search .................. 65/65 A, 25 A, 99 A, 65/182 R, 182 A

[56] References Cited

U.S. PATENT DOCUMENTS 3,506,422 4/1970 Walters ................................ 65/65 A Primary Examiner—Arthur D. Kellogg
Attorney, Agent, or Firm—Holman & Stern

[57] ABSTRACT

A process comprises feeding glass mass to the surface of metal melt for forming a glass strip of the mass and cooling the glass strip first on the metal melt and then on a gas cushion. The glass strip is transferred to the gas cushion at a strip temperature from 650° to 700° C.

1 Claim, 1 Drawing Figure

U.S. Patent    March 28, 1978    4,081,260
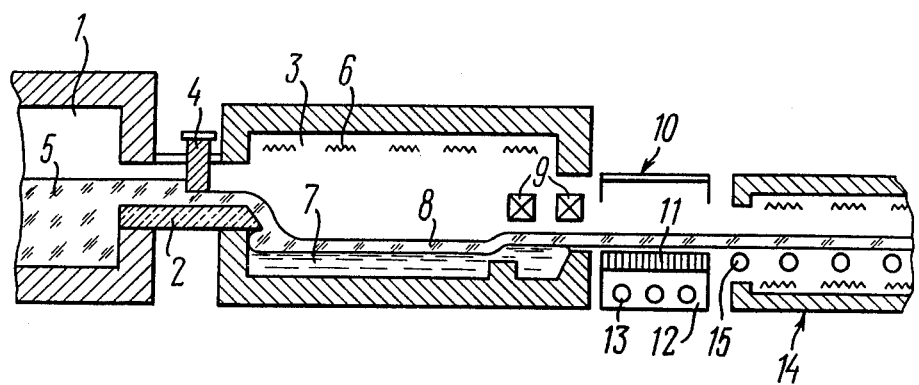

PROCESS FOR MAKING SHEET GLASS ON A FLUID SUPPORT

The invention relates to the glass-making industry, and in particular to a process for making sheet glass.

It is known to make sheet glass of glass mass by forming a continuous glass strip of glass mass and displacing the strip while cooling it down on the surface of molten metal.

One of known methods involves cooling the glass strip on the surface of molten metal to a temperature at which the glass solidifies so that further transportation of the glass strip being made might be performed using the annealing kiln runway rolls without damaging the lower side of the glass strip in contact with the rolls. This temperature does not exceed 600° C for alkaline aluminosilicate glass.

To protect exposed surface of molten metal in the bath which is not covered by the moving glass strip against oxidation, a protective atmosphere of a mixture of nitrogen and hydrogen is maintained in the bath.

The disadvantage of the above-described process resides in the possibility of metal oxidation in the zone of outlet of the glass from the bath, especially at a temperature of 600°-650° C and lower. This is due to peculiar features of the thermodynamic reaction occurring between the molten metal used for the process, gases of the protective atmosphere, and oxygen entering the bath with the glass.

Metal oxides can penetrate to the lower side of glass strip to contaminate it.

Another known process differs from the above-described process in that the glass strip is cooled to 700°-850° C on the surface of molten metal with subsequent transfer of the glass strip to a gas cushion for further cooling.

This process is deficient in that the glass strip exhibits inadequate stiffness at temperatures above 700° C so that the process of straight-line transfer of the glass strip from the metal melt to the gas cushion requires very high stability of handling. At the point of transfer from the surface of molten metal to the gas cushion, the glass strip may contact the means forming the gas cushion thus inevitably resulting in damages to the lower side of the glass strip impairing quality of the resultant glass product. This complicates the operation of the glass making plant and requires a highly skilled and very experienced operating staff.

It is an object of the invention to improve quality of glass.

Another object of the invention is to provide for stable process of glass-making.

Still another object of the invention is to simplify the control of the glass-making process.

The above and other objects are accomplished by that in a process for making sheet glass comprising feeding glass mass to the surface of molten metal, forming a glass strip of the mass, cooling said strip on the metal melt with subsequent transfer of the glass strip to a gas cushion for further cooling, according to the invention, the glass strip is transferred from the metal melt to the gas cushion at a temperature of the glass strip from 650° to 700° C.

No oxide formation takes place within the above-mentioned temperature range on the surface of molten metal. In addition, the glass strip exhibits sufficient stiffness within this temperature range so as to avoid the contact of its lower side with the means forming the gas cushion. Therefore, the percentage of discarded product is lowered considerably, Due to the fact that there is no need in exact mating of the molten metal and gas cushion levels, the operation of a glass-making plant is considerably simplified.

Furthermore, the process according to the invention enables a substantial increase in the speed of making the glass strip thus improving the productivity of the plant for the manufacture of glass strip.

Other objects and advantages of the invention will become apparent from the following detailed description of the preferred embodiment thereof and accompanying drawing, in which:

FIG. 1 shows a longitudinal section of the apparatus for carrying out the process according to the invention.

The apparatus which can be used for carrying out the process according to the invention comprises a tank furnace 1 communicating, via a passage 2, with a melt bath 3. The bath 3 has a sliding gate 4 for controlling the flow rate of glass mass 5 fed to the bath 3 and thermocontrollers 6 for maintaining required temperature conditions in the bath 3. The bath 3 is filled with molten metal 7, and a glass strip flows along the molten metal surface. An inductor 9 is provided in the bath 3 for maintaining the level of metal 7 at the outlet portion of the bath 3 above the top edge of the bath 3. A device 10 for forming a gas cushion having nozzles 11 for feeding gas to under the strip 8 is provided downstream the bath 3, the nozzles 11 being connected to a pressure chamber 12 having burners 13 inside the chamber for providing a required gas pressure. An annealing kiln 14 is provided downstream the device 10, and the kiln has driven rolls 15 for transporting the glass strip 8.

The process for making sheet glass according to the invention comprises continuously feeding to the surface of molten metal 7 a batched quantity of molten glass mass 5 at a temperature preferably from 1050° to 1150° C. The glass mass 5 is formed under gravity, surface tension and longitudinal traction forces into a continuous strip 8. The speed of drawing the strip 8 and temperature conditions are controlled depending on the required thickness and width of the glass strip 8.

Temperature conditions in the molten metal bath 3 are provided such that the glass strip 8 being formed which flows toward the outlet opening of the bath 3 is cooled down to 650°-700° C. Sufficiently high viscosity of the glass strip 8 at such temperature enables the reduction of requirements imposed on uniformity of gas supply to the gas cushion and simplification of the manufacturing process. The glass strip 8 is fed out of the bath 3 to the gas cushion while maintaining the horizontal position of the strip, and by means of the inductor 9, the level of the metal melt 7 at the outlet portion of the bath 3 is held above the level of the wall of the bath 3. Gas temperature of the gas cushion and heat removal from the top side of the glass strip 8 are controlled in such a manner as to provide for transfer of the glass strip 8 to the rolls 15 of the annealing kiln 14 at a temperature equal to or slightly above the upper temperature limit of the beginning of the annealing process (560°-580° C).

By controlling the gas cushion temperature, the glass strip 8 is transferred to the rolls 15 of the annealing kiln 14 at a temperature equal to or slightly above the initial annealing temperature (560°-580° C).

Water coolers may also be used for cooling the glass strip 8 (not shown) which may be installed under the glass strip 8 moving over the gas cushion.

What is claimed is:

1. A process for making sheet glass comprising feeding glass mass to the surface of molten metal in a bath having an outlet portion including an end wall, said end wall having a top edge, for forming a glass strip of the mass; cooling said glass strip as it flows along said melt surface; maintaining the level of the molten metal above said top edge of said end wall in the area of the outlet portion by inductor means; rectilinearly transferring said glass strip from said metal melt to a gas cushion for further cooling of said strip; said glass strip is transferred to said gas cushion at a temperature of said strip from 650° to 700° C.

* * * * *